July 9, 1929.  W. A. LENZ  1,720,557
PHOTOPRINT WASHER
Filed April 29, 1926  2 Sheets-Sheet 1
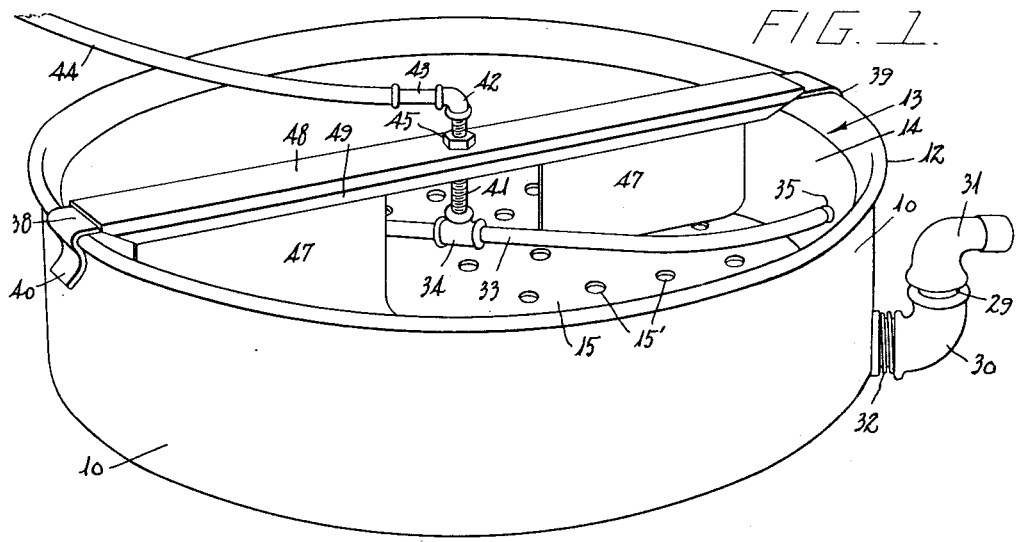
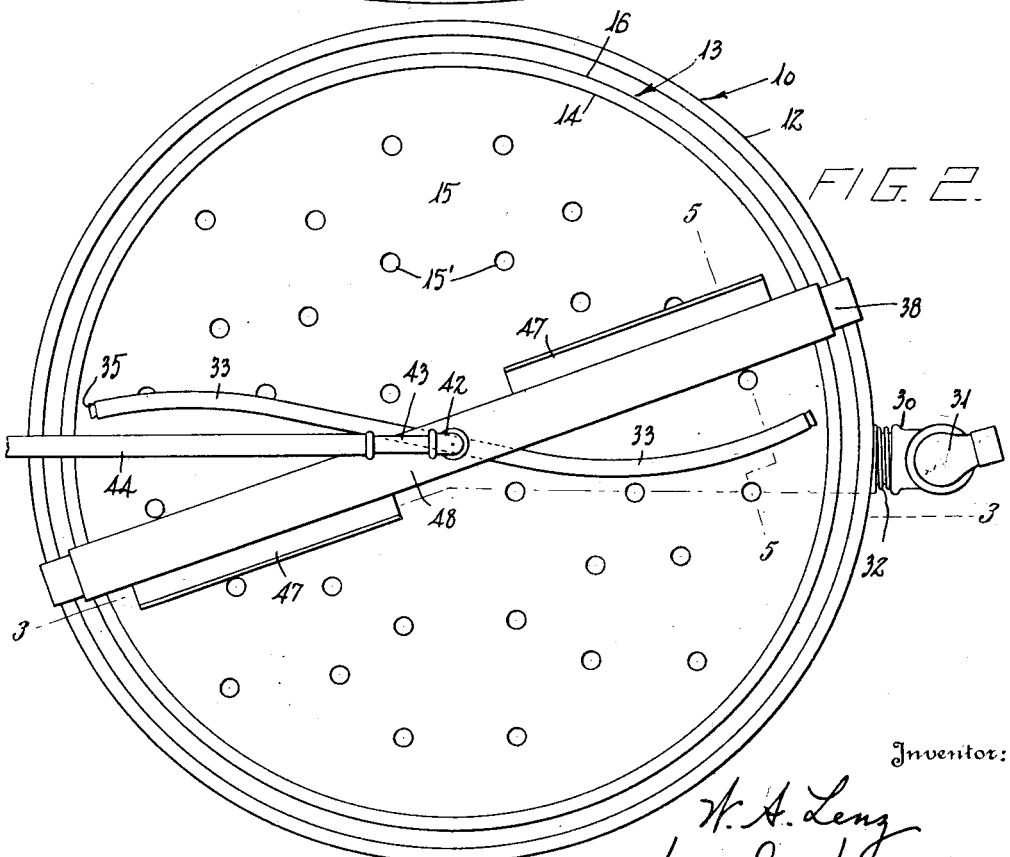

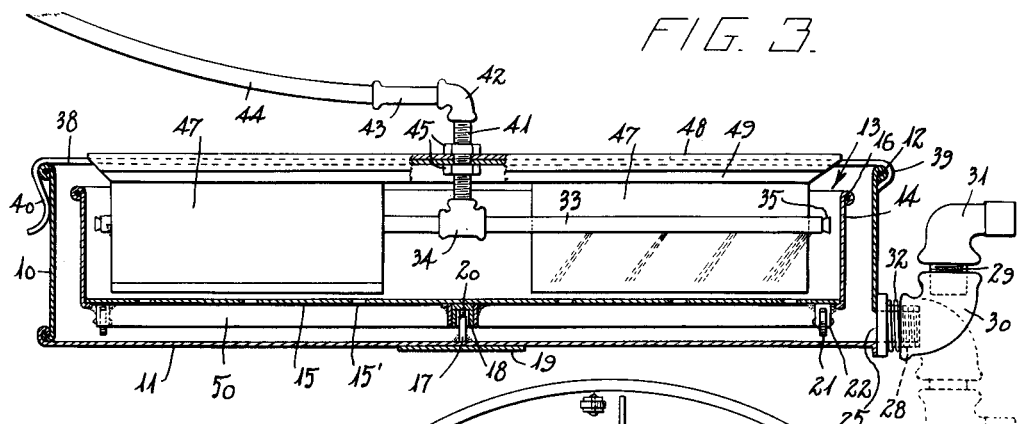
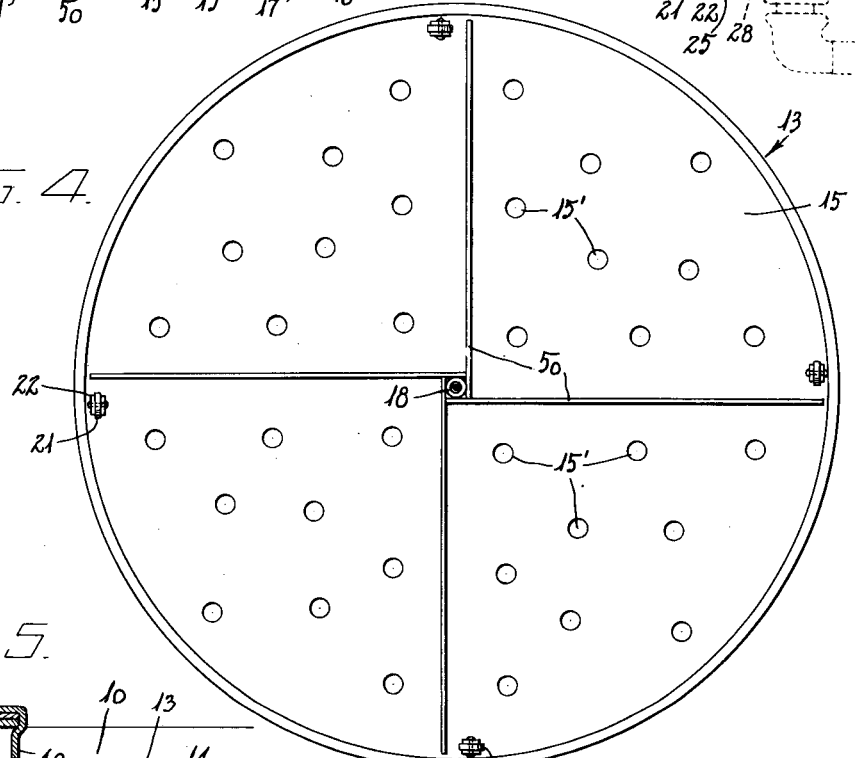
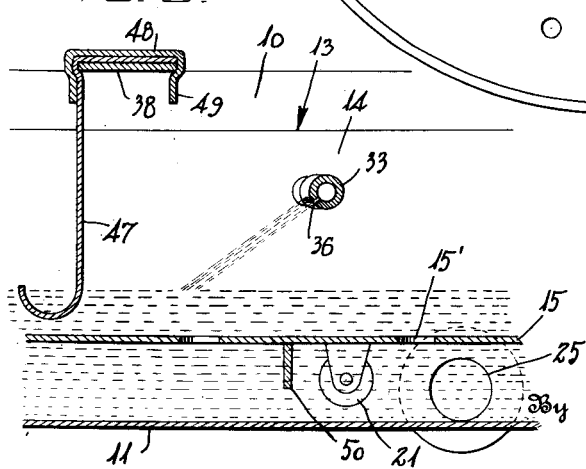

Patented July 9, 1929.

1,720,557

UNITED STATES PATENT OFFICE.

WILLIAM A. LENZ, OF LEBANON, MISSOURI.

PHOTOPRINT WASHER.

Application filed April 29, 1926. Serial No. 105,474.

The present invention relates to devices for washing and rinsing photographic prints, films, and the like, and is particularly an improvement over the photo-print washer disclosed in my Patent No. 1,526,603, granted February 17, 1925.

It is the object of the invention to improve and simplify the washer generally in its construction and details, to enhance the utility and efficiency thereof.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a perspective view of the improved washer.

Fig. 2 is a plan view thereof.

Fig. 3 is a vertical section on the line 3—3 of Fig. 2.

Fig. 4 is a bottom view of the basket.

Fig. 5 is an enlarged vertical section on the line 5—5 of Fig. 2.

A tub or pan 10 of circular form and of any suitable size is provided which has the bottom 11 and the outstanding bead 12 at its rim, and a basket 13 of circular shape is disposed concentrically within the tub and is of slightly smaller diameter, to provide a suitable clearance between the walls of the tub and basket. This basket is made of smooth sheet metal, so as not to injure the prints, films or other sensitive articles while being washed. The circular wall 14 of the basket is composed of imperforate sheet metal, while the bottom 15 has relatively few scattered apertures or holes 15' therein. By using sheet metal the inner surface of the basket is smooth, even though the bottom of the basket has the holes therein, thereby avoiding a rough surface such as would be presented by the use of wire mesh. The rim of the basket 13, or the upper edge of the wall 14, is formed with an outstanding bead 16 so as to strengthen the basket.

The basket 13 is mounted in the tub for rotary motion, so as to turn with the water which has a whirling motion in the tub, as will hereinafter more fully appear. Thus, the basket is pivoted centrally of its bottom on the bottom of the tub by means of a step bearing including a pivot stud 17 rising from the bottom of the tub and a sleeve 18 depending from the bottom of the basket and rotatable on said stud. As shown, a ball 20 is disposed on the sleeve 18 between the stud 17 and basket, so that the basket will rotate freely. A plate 19 is soldered or otherwise secured to the bottom 11 of the tub below the stud 17, to strengthen said bottom surrounding the stud 17. The stud 17 and sleeve 18 are soldered or otherwise secured to the bottoms of the tub and basket, respectively.

In order to limit the tilting movement of the basket and prevent the parts thereof from contacting with the wall or bottom of the tub, rollers 21 are carried by the basket below the bottom thereof adjacent to the rim or wall of the basket. The rollers 21 are mounted for rotation in inverted U-shaped hangers 22 which are soldered or otherwise secured to the bottom 15 of the basket. The rollers are normally spaced above the bottom of the tub when the basket is in its normal horizontal position, but should the basket tilt in any direction one of the rollers will come into contact with the bottom of the tub, thereby limiting the tilting movement of the basket without creating friction sufficient to retard the rotation of the basket.

The water outlet opening 25 is provided in the wall 10 of the tub, adjacent to the bottom, and means is provided for regulating the level of the water in the tub and basket, and for draining the water therefrom. An outstanding nipple 28 is soldered or otherwise secured to the wall of the tub around the outlet opening 25. An elbow 30 is screw-threaded on the nipple 28, and a nipple or short pipe section 29 is screw-threaded in the other end or arm of the elbow 30, with an elbow 31 screw-threaded on the nipple 29. The elbows 30 and 31 and nipple 29 provide an adjustable water discharge controller. Thus, the elbow 30 may be turned on the nipple 28 to position the discharge end of the elbow 31 at different elevations above and below the bottom 11 of the tub. When the elbows 30 and 31 are in the position shown in full lines in Fig. 3, the water will fill the tub and basket up to a corresponding level, and the elbow 30 may be turned to adjust the elbow 31 downwardly when a lower level of water in the tub and basket is desired. By turning the elbow 30 downwardly, as seen in dotted lines in Fig. 3, the water may be drained from the tub The elbow 31 may also be turned on the nipple 29 for directing the water in different directions. A coil spring 32 surrounds the nipple 28 and is confined between the elbow 30 and base flange of the nipple 28 to provide friction for holding the elbow 30 in the different positions to which it is turned. By positioning the elbow 30 it is thus possible to regulate the depth of water in the tub and basket, according to the number of prints being washed, and the elbow 30 may be turned downwardly for draining the water from the basket and tub quickly and conveniently.

The water spraying or delivering means comprises the spray pipes 33 extending in opposite directions, and connected at their adjacent ends to a T coupling 34, stoppers 35 being secured in the outer ends of said pipes. The pipes 33 have the discharge apertures 36 therein directed downwardly and inwardly, so that the jets of water discharged from the pipes are directed downwardly into the basket, and in opposite directions from the two pipes 33, in order that the water within the tub will be given a whirling motion. Furthermore, the water jets are directed inwardly in order to work the water and prints toward the center, and avoid the prints from accumulating adjacent to the wall of the basket. The pipes 33 are curved so that their outer ends are bent slightly toward the direction in which the water moves, so that the water discharging from the outermost apertures 36 will be directed away from instead of toward the wall of the basket.

The spray pipes 33 are supported within the mouth of the basket by a bridge 38 composed of a strip or bar spanning the tub. The bridge or bar 38 has one end bent into a hook 39 to engage the bead 12, and the opposite terminal of the bridge or bar is bent to form a snap hook 40 to also engage said bead. The bridge 38 is positioned diametrically over the tub and the hook 39 is engaged with the bead, after which the hook 40 can be pressed down and snapped under the bead, thereby maintaining the bridge in position. A short vertical pipe 41 extends through the bridge 38 between the ends thereof, and is screw-threaded into the coupling 34, and an elbow 42 being screw-threaded on the upper end of said pipe 41. A nipple 43 is secured to the elbow 42 for the connection of a hose or tube 44 through which the water is supplied from a faucet or the like. Nuts 45 are threaded on the pipe 41 above and below the bridge 38 for adjustably securing the pipe 41 to the bridge, and permitting said pipe to be adjusted upwardly and downwardly for positioning the spray pipes 33 in the desired horizontal position within the basket.

Flaps or curtains 47, which may be of suitable fabric, rubber or other flexible material, are hung from the bridge 38 in front of the spray pipes 33 so as to dip or depend in the water, with the jets that discharge from the spray pipes directed toward the lower edges of said flaps. Said flaps in depending in the water in front of the jets, will direct the water from the jets under the flaps, so as to deflect the prints toward the bottom of the basket when passing under said flaps. This will agitate the prints as well as keeping them separated. The upper edges of the flaps 47 bear on the bridge 38, and in order to fasten the flaps on the bridge a retainer strip or clasp 48 bears on the bridge 38 and has its edges 49 bent downwardly to snap under the edges of the bridge 38 and thereby clamp said flaps on the bridge, as well as strengthening the bridge. The two flaps 47 are at opposite edges of the bridge 38, and the strip 48 is of a shorter length than the bridge so as not to extend to the walls of the basket and tub. The pipe 41 also extends through the strip 48, and by disconnecting the elbow 42 and coupling 34, the strip 48 can be removed from the bridge for removing and replacing the flaps 47 conveniently.

The water at the bottom of the tub below the basket is directed outwardly toward the wall of the tub, so as to keep the water in the basket and tub as fresh as possible. For this purpose, depending deflectors 50 are carried by the bottom of the basket, and said deflectors are soldered or otherwise secured to the bottom of the basket. Said deflectors are straight, being substantially radial, in order that the deflectors will direct the water, which is below the bottom of the basket, outwardly toward the wall of the tub.

In operation, the hose 44 is connected to a faucet, hydrant or other source of water, and the water is turned on so as to fill the tub and basket up to a level determined by the vertical adjustment of the elbow or discharge terminal 31, and the water discharged from said elbow 31 may pass into a sink or other receiver. The prints or films to be washed are then placed in the water within the basket. The jets of water discharging from the spray pipes 33 downwardly and inwardly at an angle into the water in the basket, will set the water into whirling motion, and the velocity and agitation of the water is controlled by regulating the flow of water through the spray pipes. The prints are carried around with the water, and the whirling motion of the water will also rotate the basket with it, so that the water prints and basket all rotate together. This will prevent the prints or negatives from being scratched or injured when contacting with the basket, inasmuch as the basket is moving at the same speed as the prints or negatives. The water being sprayed downwardly into the basket will also force the prints downwardly within the water in the basket as the prints pass under the spray pipes, and the agitation of the water will keep the prints separated. The flaps or curtains 47 will prevent excessive splashing of the water where the jets strike the water in the tub, as well as directing the water downwardly toward the bottom of the basket. The flaps will also direct the prints downwardly as they pass under the flaps. As a result, even though a large number of prints are being washed, they will be kept in motion and will be prevented from clinging together or accumulating at any portion of the basket. The prints are kept down in the water below the surface thereof by the jets discharging downwardly and the flaps 47, and the jets of water are also directed inwardly to prevent the prints from accumulating at the wall of the basket, inasmuch as the jets have a tendency to direct the prints toward the center, although they will not accumulate at the center of the basket. The fresh water is supplied from above diametrically across the basket, and due to the whirling motion of the water, the fresh water is thus distributed entirely over the surface of the water in the basket. The water flows downwardly in the basket to the perforated bottom thereof, so that there is a steady downward movement of the water, but the same is not sufficiently rapid to carry the prints down against the bottom of the basket. From below the basket, the water flows outwardly to the wall of the tub. The deflectors 50 will direct the water outwardly toward the wall of the tub, where the water flows through the outlet 25. The water being directed outwardly by the deflectors 50 will be delivered to the annular space between the walls of the tub and basket, from which space the water flows through the outlet 25. In this way there is a constantly changing flow of fresh water through the basket and tub from the top to the bottom, during the whirling motion of the water and rotation of the basket. After the prints have been washed for a desired length of time, they are removed from the basket and dried, it being noted that the basket is open and accessible. Furthermore, the bridge 38 can be removed from the tub, which will also permit the basket to be lifted out of the tub. The parts of the washer can therefore be readily taken apart for cleaning or repairs, and the washer can be conveniently and economically manufactured. It has been found in actual practice that with the present washer the prints are suspended within the water within the basket in an annular arrangement between the center and wall of the basket, and the prints, for the most part, assume an inclined position at about the angle that the water is sprayed into the basket, with the prints spaced apart. The deflectors 50 will not have a tendency for deflecting the water upwardly through the holes in the bottom of the basket, inasmuch as the holes 15' are spaced from the deflectors. Inasmuch as the bottom of the basket has only a relatively few holes therein, there will be no tendency for the water to back upwardly through said holes, so that the water is trapped below and around the basket. Therefore, when the water flows downwardly through the holes in the bottom of the basket, after dissolving the solution from the prints, the water containing the solution passes downwardly through the bottom of the basket, thus keeping the water fresh within the basket.

Having thus described the invention, what is claimed as new is:—

A photo print washer comprising a tub having an outlet in the wall thereof, a basket rotatable in the tub about a vertical axis and having a perforated bottom and an imperforate circular wall, means for delivering water downwardly at an angle into the basket for whirling the water in the tub and rotating the basket, and depending deflectors carried by the bottom of the basket and of such form that the rotation of the basket will direct the water outwardly between the bottoms of the tub and basket toward the wall of the tub.

In testimony whereof I hereunto affix my signature.

WILLIAM A. LENZ.